US007797525B2

(12) United States Patent
Lee et al.

(10) Patent No.: US 7,797,525 B2
(45) Date of Patent: Sep. 14, 2010

(54) OPERATING SYSTEM INSTALLATION

(75) Inventors: Sam Jung-Won Lee, Spring, TX (US);
Charles J. Bordelon, Cypress, TX (US);
Wayne P. Sharum, Spring, TX (US);
Joseph W. Hoch, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

(21) Appl. No.: 10/883,416

(22) Filed: Jul. 1, 2004

(65) Prior Publication Data

US 2006/0005016 A1 Jan. 5, 2006

(51) Int. Cl.
*G06F 15/177* (2006.01)

(52) U.S. Cl. .......................................................... 713/2
(58) Field of Classification Search .................... 713/2, 713/1

See application file for complete search history.

(56) References Cited

U.S. PATENT DOCUMENTS

| 5,280,627 | A | | 1/1994 | Flaherty et al. | |
|---|---|---|---|---|---|
| 5,325,532 | A | * | 6/1994 | Crosswy et al. | 713/100 |
| 5,452,454 | A | | 9/1995 | Basu | |
| 5,758,165 | A | | 5/1998 | Shuff | |
| 5,842,011 | A | | 11/1998 | Basu | |
| 5,948,101 | A | * | 9/1999 | David et al. | 713/2 |
| 6,247,128 | B1 | * | 6/2001 | Fisher et al. | 713/100 |
| 6,317,826 | B1 | | 11/2001 | McCall et al. | |
| 6,453,413 | B1 | * | 9/2002 | Chen et al. | 713/2 |
| 6,490,677 | B1 | * | 12/2002 | Aguilar et al. | 713/1 |
| 6,557,169 | B1 | | 4/2003 | Erpeldinger | |
| 6,560,706 | B1 | | 5/2003 | Carbajal et al. | |
| 6,591,376 | B1 | | 7/2003 | VanRooven et al. | |
| 6,594,757 | B1 | | 7/2003 | Martinez | |
| 6,601,212 | B1 | | 7/2003 | Guha et al. | |
| 6,611,915 | B1 | | 8/2003 | Kubik et al. | |
| 6,658,562 | B1 | | 12/2003 | Bonomo et al. | |
| 6,691,160 | B1 | | 2/2004 | Bradley | |
| 6,711,676 | B1 | * | 3/2004 | Zomaya et al. | 713/100 |
| 6,735,692 | B1 | | 5/2004 | Murphrey et al. | |
| 6,751,658 | B1 | * | 6/2004 | Haun et al. | 713/2 |
| 7,159,106 | B2 | * | 1/2007 | Meaney et al. | 713/2 |

(Continued)

FOREIGN PATENT DOCUMENTS

WO WO2004040438 5/2004

OTHER PUBLICATIONS

"System Management BIOS Reference Specification", American Megatrends Inc., Award Software International Inc., Compaq Computer Corporation, Dell Computer Corporation, Hewlett-Packard Company, Intel Corporation, International Business Machines Corporation, Phoenix Technologies Limited, and SystemSoft Corporation, Version 2.3, pp. 1-97 (Aug. 12, 1998).

(Continued)

*Primary Examiner*—Thomas Lee
*Assistant Examiner*—Eric Chang (57) ABSTRACT

A programmable electronic device automatically identifies at least a portion of a system configuration for the programmable electronic device and automatically generates an image request based at least in part on the identified system configuration. The programmable electronic device transmits the image request over one or more networks to a server, receives an image of operating system software, and installs the received image.

29 Claims, 4 Drawing Sheets

U.S. PATENT DOCUMENTS

| | | | |
|---|---|---|---|
| 7,191,327 B2 * | 3/2007 | Viljoen et al. | 713/2 |
| 7,237,104 B2 * | 6/2007 | Philyaw | 713/1 |
| 7,356,679 B1 * | 4/2008 | Le et al. | 713/1 |
| 2003/0046529 A1 * | 3/2003 | Loison et al. | 713/2 |
| 2003/0195995 A1 | 10/2003 | Tabbara | |
| 2004/0083355 A1 | 4/2004 | Smith et al. | |

OTHER PUBLICATIONS

"Rapport Administrative Software for Compaq Thin Clients, v3.01", White Paper, Compaq Computer Corporation, Document Part No. 157P-1201C-WWEN, pp. 1-22 (1st Ed., Feb. 2002).

"Quick Reference and Administrator's Guide: For Microsoft Windows CE .NET-based Thin Clients", Compaq Computer Corporation, Document Part No. 303534-001, pp. i to vi, 1-1, 2-1 to 2-9, and 3-1 to 3-125 (Aug. 2002).

"Administrator's Guide: Microsoft Windows CE .NET-based Thin Clients", Hewlett-Packard Company, Document Part No. 349401-001, pp. i to v, 1-1, 2-1 to 2-3, 3-1 to 3-3, 4-1 to 4-19, and 5-1 to 5-45 (1st Ed., Sep. 2003).

* cited by examiner

OPERATING SYSTEM INSTALLATION

BACKGROUND ART

A user of a network computer, such as a thin client or a terminal for example, may want to restore software for an operating system on the network computer, for example, if the operating system software becomes corrupted. A user of a network computer may also want to upgrade software for an operating system on a network computer, for example, when bugs in the operating system have been identified and fixed and/or when new features have been added to the operating system. One or more techniques for restoring and/or upgrading operating system software require a user to have knowledge of both the correct operating system software for the restoration or upgrade as well as the procedure to perform the restoration or upgrade.

As one example, a user of a network computer may have to obtain a compact disc (CD) having an image of the correct operating system software for a restoration or upgrade and identify and execute software on the CD or network computer to install the image on the network computer. Having to obtain a new CD for an upgrade or having to identify among multiple CD's the one or more CD's having the desired version of operating system software exacerbates this procedure.

As another example, a user of a network computer may have to identify, and possibly supply the address of, a file transfer protocol (FTP) server and identify, and possibly supply the name of, a specific file having an image of the correct operating system software for a restoration or upgrade. The identified file may then be downloaded from the identified server for installation of the image on the network computer.

A user of a network computer may alternatively create a backup image of operating system software currently installed on the network computer to later restore the operating system software by installing the backup image. Such a technique, however, requires the user to create a backup image and possibly to identify the desired version of a backup image among multiple created backup images when the operating system software is to be restored. Such a technique may not be used to upgrade to operating system software not previously installed on the network computer.

A user may want to restore or upgrade firmware, for example, on an Internet appliance, such as a router for example. One or more techniques to do so require a user to use a host computer system that communicates with the router to identify on a server on the Internet a specific file having the correct firmware and to download the identified file onto the host computer system. The user then identifies and executes software in the identified file and/or on the host computer system to install the firmware on the router.

SUMMARY

One disclosed method comprises automatically identifying by a programmable electronic device at least a portion of a hardware configuration and an operating system for the programmable electronic device, automatically generating by the programmable electronic device an image request based at least in part on both the identified hardware configuration and the identified operating system, transmitting the image request by the programmable electronic device over one or more networks to a server, receiving by the programmable electronic device an image of software for the identified operating system, and installing the received image on the programmable electronic device.

One disclosed method comprises enabling by a programmable electronic device selection of one of a plurality of versions of operating system software, automatically identifying by the programmable electronic device at least a portion of a system configuration for the programmable electronic device, automatically generating by the programmable electronic device an image request based at least in part on a selected version of operating system software and the identified system configuration, transmitting the image request by the programmable electronic device over one or more networks to a server, receiving by the programmable electronic device an image of the selected version of operating system software, and installing the received image on the programmable electronic device.

One disclosed programmable electronic device comprises memory and/or storage to store installation software, one or more communications interfaces to communicate over one or more networks, and one or more processors to execute instructions of the installation software to identify automatically at least a portion of a hardware configuration and an operating system, to generate automatically an image request based at least in part on both the identified hardware configuration and the identified operating system, to transmit the image request over one or more networks to a server using one or more communications interfaces, to receive an image of software for the identified operating system using one or more communications interfaces, and to install the received image in memory and/or storage.

One disclosed programmable electronic device comprises memory and/or storage to store installation software, one or more input devices, one or more communications interfaces to communicate over one or more networks, and one or more processors to execute instructions of the installation software to enable selection of one of a plurality of versions of operating system software using one or more input devices, to identify automatically at least a portion of a system configuration, to generate automatically an image request based at least in part on a selected version of operating system software and the identified system configuration, to transmit the image request over one or more networks to a server using one or more communications interfaces, to receive an image of the selected version of operating system software using one or more communications interfaces, and to install the received image in memory and/or storage.

One disclosed medium is to store instructions which, if executed by a programmable electronic device, perform a method comprising automatically identifying at least a portion of a hardware configuration and an operating system for the programmable electronic device, automatically generating an image request based at least in part on both the identified hardware configuration and the identified operating system, transmitting the image request over one or more networks to a server, receiving an image of software for the identified operating system, and installing the received image on the programmable electronic device.

One disclosed medium is to store instructions which, if executed by a programmable electronic device, perform a method comprising enabling selection of one of a plurality of versions of operating system software, automatically identifying at least a portion of a system configuration for the programmable electronic device, automatically generating an image request based at least in part on a selected version of operating system software and the identified system configuration, transmitting the image request over one or more networks to a server, receiving an image of the selected version of operating system software, and installing the received image on the programmable electronic device.

One disclosed programmable electronic device comprises means for automatically identifying at least a portion of a hardware configuration and an operating system for the programmable electronic device, means for automatically generating an image request based at least in part on both the identified hardware configuration and the identified operating system, means for transmitting the image request over one or more networks to a server, means for receiving an image of software for the identified operating system, and means for installing the received image.

One disclosed programmable electronic device comprises means for enabling selection of one of a plurality of versions of operating system software, means for automatically identifying at least a portion of a system configuration for the programmable electronic device, means for automatically generating an image request based at least in part on a selected version of operating system software and the identified system configuration, means for transmitting the image request over one or more networks to a server, means for receiving an image of the selected version of operating system software, and means for installing the received image.

DETAILED DESCRIPTION

Figure 1:
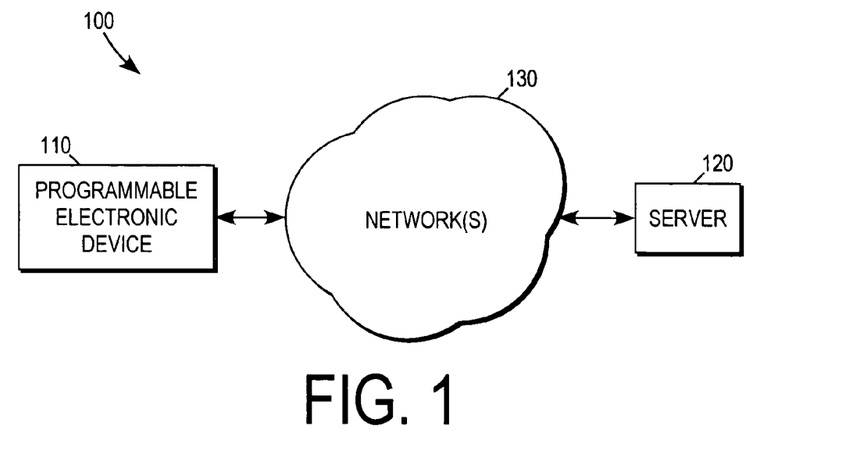
FIG. 1 illustrates, for one or more embodiments, an example system having a programmable electronic device that can communicate with a server over one or more networks to request and receive an operating system software image for installation on the programmable electronic device.

FIG. 1 illustrates, for one or more embodiments, a system 100 comprising a programmable electronic device 110, a server 120, and one or more networks 130. Device 110 can communicate with server 120 over network(s) 130 to request and receive an operating system software image for installation on device 110.

Programmable electronic device 110 for one or more embodiments may be any suitable programmable electronic device that has rewritable memory and/or storage and that functions at least in part by executing instructions of operating system software. Device 110 may be, for example and without limitation, a terminal, a workstation, a network computer, a thin client, a fat client, a server, a desktop computer, a laptop or notebook computer, a tablet computer, a handheld computer, a mobile computer, an ultra-personal computer (UPC), a personal digital assistant (PDA), a digital telephone, a cellular telephone, a smartphone, an Internet appliance, an e-mail appliance, a server appliance, a network appliance, a router, a network storage device, a firewall appliance, a printer, a copy machine, a scanner, a facsimile machine, a multifunction product (MFP), a point-of-sale (POS) terminal, a manufacturing tool, a robot, a home appliance, a security system, a set-top box, a video game console, a digital picture frame, a digital media (image, video, and/or audio) player, a television, a stereo component, a kitchen appliance, an exercise machine, an electronic musical instrument, an electronic toy, a power tool, a furnace and/or air conditioner, or an automobile.

Automatic Operating System Image Installation

Figure 2:
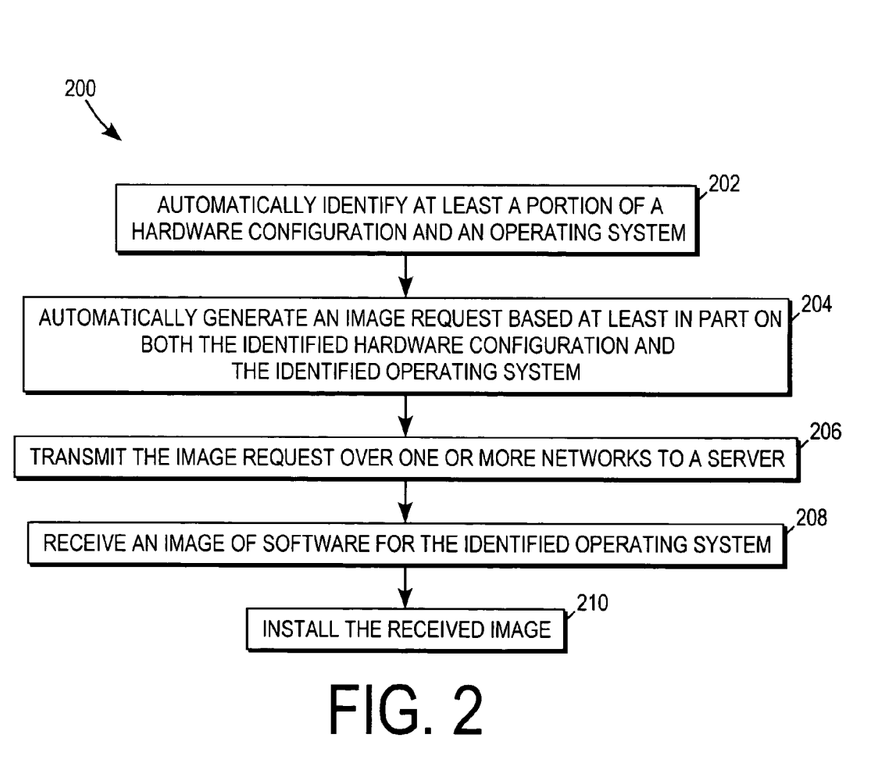
FIG. 2 illustrates, for one or more embodiments, a flow diagram for a programmable electronic device to request an operating system software image from a server and to receive and install the operating system software image on the programmable electronic device.

Programmable electronic device 110 for one or more embodiments may request, receive, and install an operating system software image in accordance with a flow diagram 200 of FIG. 2.

For block 202, programmable electronic device 110 automatically identifies at least a portion of a hardware configuration and an operating system for device 110. Device 110 may automatically identify at least a portion of any suitable hardware configuration and any suitable operating system for device 110 in any suitable manner.

Programmable electronic device 110 for one or more embodiments may identify at least a portion of its hardware configuration by identifying itself. Device 110 for one or more embodiments may identify itself by identifying any suitable information about device 110 such as, for example and without limitation, its manufacturer's name and/or identification code, its model name and/or identification code, its product name and/or identification code, its product family name and/or identification code, its version number and/or identification code, its serial number and/or identification code, and/or its basic input/output system (BIOS) name and/or identification code.

Programmable electronic device 110 for one or more embodiments may identify information about device 110 based on information at any suitable one or more locations at which such information may be stored and/or hardwired in device 110. Device 110 for one embodiment may be loaded and/or hardwired with such information at its time of manufacture. Device 110 for one embodiment may comprise any suitable memory or storage device in which basic input/output system (BIOS) software has been or may be loaded and may have such information in such BIOS software. Device 110 for one embodiment may have such information in one or more records of such BIOS software.

Programmable electronic device 110 for one or more embodiments may identify at least a portion of its hardware configuration by identifying one or more components of device 110. Device 110 for one embodiment may identify, for example, a processor and/or a motherboard of device 110. Device 110 for one or more embodiments may identify a component of device 110 by identifying any suitable information about the component such as, for example and without limitation, its manufacturer's name and/or identification code, its model name and/or identification code, its product name and/or identification code, its product family name and/or identification code, its version number and/or identification code, its serial number and/or identification code, and/or its basic input/output system (BIOS) name and/or identification code.

Programmable electronic device 110 for one or more embodiments may identify information about a component based on information at any suitable one or more locations at which such information may be stored and/or hardwired in the component. The component for one embodiment may be loaded and/or hardwired with such information at its time of manufacture. Device 110 for one embodiment may comprise any suitable memory or storage device in which basic input/output system (BIOS) software has been or may be loaded and may have such information in such BIOS software. Device 110 for one embodiment may have such information in one or more records of such BIOS software.

Programmable electronic device 110 for one or more embodiments may identify an operating system for device 110 independent of the identified hardware configuration.

Programmable electronic device 110 for one or more embodiments may identify an operating system for device 110 based on an operating system currently resident on device 110. Device 110 for one or more embodiments may identify an operating system currently resident on device 110 by identifying any suitable information about software for the operating system such as, for example and without limitation, its manufacturer's name and/or identification code, its model name and/or identification code, its product name and/or identification code, its product family name and/or identification code, its version number and/or identification code, its build number and/or identification code, its serial number and/or identification code, a path and/or file name for an image with which the currently installed operating system software was installed, a path and/or file name for an image with which the same version of the currently installed operating system software may be installed, a path and/or file name for an image with which an original version of the currently installed operating system software may be installed, a path and/or file name for an image with which an upgrade version of the currently installed operating system software may be installed, and/or a path and/or file name for an image with which software for a new operating system may be installed.

Programmable electronic device 110 for one or more embodiments may identify information about software for an operating system currently resident on device 110 based on information at any suitable one or more locations at which such information may be stored. Such information for one embodiment may be loaded at any suitable one or more locations of device 110 at the time of installation of the software for an operating system on device 110. The software for an operating system for one embodiment may itself contain such information in any suitable one or more locations. The software for an operating system for one embodiment may contain such information, for example, in a registry for the operating system software. The software for an operating system for one embodiment may contain such information, for example, as one or more values in a registry for the operating system software.

Programmable electronic device 110 for one or more embodiments may identify an operating system for device 110 by identifying a portion of software for the operating system currently resident on device 110. Device 110 may identify any suitable portion of software for the operating system currently resident on device 110, such as one or more software modules, one or more drivers, and/or one or more files for example. Device 110 for one or more embodiments may identify a portion of software for an operating system currently resident on device 110 by identifying any suitable information about the portion such as, for example and without limitation, its manufacturer's name and/or identification code, its model name and/or identification code, its product name and/or identification code, its product family name and/or identification code, its version number and/or identification code, its build number and/or identification code, its serial number and/or identification code, and/or its file name and/or identification code.

Programmable electronic device 110 for one or more embodiments may identify information about a portion of software for an operating system currently resident on device 110 based on information at any suitable one or more locations at which such information may be stored. Such information for one embodiment may be loaded at any suitable one or more locations of device 110 at the time of installation of the portion of software for an operating system on device 110. The portion of software for an operating system for one embodiment may itself contain such information in any suitable one or more locations. The software for an operating system for one embodiment may contain such information, for example, in a registry for the operating system software. The software for an operating system for one embodiment may contain such information, for example, as one or more values in a registry for the operating system software.

Programmable electronic device 110 for one or more embodiments may identify an operating system for device 110 based on any suitable information at any suitable one or more locations at which such information may be stored. The identified operating system may or may not be the same as that currently resident on device 110. Device 110 for one or more embodiments may identify an operating system for device 110 based on, for example and without limitation, a manufacturer's name and/or identification code for the operating system, its model name and/or identification code, its product name and/or identification code, its product family name and/or identification code, its version number and/or identification code, its build number and/or identification code, its serial number and/or identification code, and/or a path and/or file name for an image with which software for the operating system may be installed. The software for an operating system currently resident on device 110 for one embodiment may itself contain such information in any suitable one or more locations. The software for an operating system currently resident on device 110 for one embodiment may contain such information, for example, in a registry for the operating system software. The software for an operating system currently resident on device 110 for one embodiment may contain such information, for example, as one or more values in a registry for the operating system software.

For block 204, programmable electronic device 110 automatically generates an image request based at least in part on both the identified hardware configuration and the identified operating system. Device 110 may automatically generate any suitable image request based at least in part on both the identified hardware configuration and the identified operating system in any suitable manner.

Programmable electronic device 110 for one or more embodiments may generate an image request that identifies at least the identified hardware configuration and the identified operating system in any suitable manner to help identify an image of software for the identified operating system for installation on device 110. Device 110 for one embodiment may generate an image request that identifies the identified hardware configuration, for example, by a name and/or an identification code. Device 110 for one embodiment may generate an image request that identifies device 110 itself, for example, by a name and/or an identification code. Device 110 for one embodiment may generate an image request that identifies the identified operating system, for example, by a name and/or an identification code.

Programmable electronic device 110 for one or more embodiments may itself automatically identify an image of software for the identified operating system for installation on device 110 based at least in part on both the identified hardware configuration and the identified operating system in any suitable manner and generate an image request that identifies the identified image. Device 110 may generate an image request that identifies the identified image in any suitable manner. Device 110 for one embodiment may generate an image request that identifies the identified image, for example, by a name and/or an identification code.

Programmable electronic device 110 for one or more embodiments may generate an image request that identifies a path and/or an image file name on server 120 based at least in part on both the identified hardware configuration and the identified operating system. Device 110 for one or more embodiments may generate an image request having a uniform resource identifier (URI), such as a uniform resource locator (URL) for example, based at least in part on both the identified hardware configuration and the identified operating system to identify a file having the image of software for the identified operating system for installation on device 110. As is well known in the art, a URL includes a scheme defining a syntax for the path. In one embodiment, the scheme is a file transfer protocol scheme. Device 110 for one or more embodiments may generate a file transfer protocol (FTP) request based at least in part on both the identified hardware configuration and the identified operating system to identify a file having the image of software for the identified operating system for installation on device 110.

Programmable electronic device 110 for one or more embodiments for block 204 may automatically identify server 120 in any suitable manner. Device 110 for one or more embodiments may identify a name and/or an address of server 120 in any suitable manner. Device 110 for one or more embodiments may identify server 120 based on any suitable information at any suitable one or more locations at which such information may be stored. Such information for one embodiment may be loaded at any suitable one or more locations of device 110 at the time of installation of the software for an operating system on device 110. The software for an operating system for one embodiment may itself contain such information in any suitable one or more locations. The software for an operating system for one embodiment may contain such information, for example, in a registry for the operating system software. The software for an operating system for one embodiment may contain such information, for example, as one or more values in a registry for the operating system software.

For block 206, programmable electronic device 110 transmits the image request over network(s) 130 to server 120. Device 110 may transmit the image request in any suitable manner over any suitable network(s) 130 to server 120.

Programmable electronic device 110 and/or server 120 may communicate with network(s) 130 in any suitable manner. Device 110 and/or server 120 for one embodiment may be physically coupled to network(s) 130 by any suitable one or more communications lines. Device 110 and/or server 120 for one embodiment may communicate with network(s) 130 using any suitable wireless transmission such as, for example and without limitation, by infrared line of sight, cellular, microwave, satellite, packet radio and/or spread spectrum for example. Network(s) 130 for one or more embodiments may comprise, for example and without limitation, one or more local area networks (LANs), one or more metropolitan area networks (MANs), one or more wide area networks (WANs), one or more telephone networks, one or more cellphone systems, and/or the Internet.

Server 120 may comprise any suitable hardware and/or software to receive the image request from device 110 in any suitable manner and in response to the received image request to perform any suitable one or more operations to have an image of software identified in accordance with the received image request transmitted over network(s) 130 to device 110.

Server 120 for one embodiment may comprise a file server that stores one or more files of one or more images of software for installation on any suitable one or more devices, such as device 110 for example, on network(s) 130. Such a file server for one embodiment may identify a file of an image of software and transmit the file over network(s) 130 to device 110 in accordance with the received image request.

Server 120 for one embodiment may, in response to receiving an image request, request another computer system, for example, to transmit an image of software identified in accordance with the received image request to server 120 for transmission over network(s) 130 to device 110. Server 120 for one embodiment may, in response to receiving an image request, request another computer system, for example, to transmit an image of software identified in accordance with the received image request over network(s) 130 to device 110 without transmitting the image to server 120.

For block 208, programmable electronic device 110 receives an image of software for the identified operating system for installation on device 110. Device 110 may receive the image in any suitable manner.

For block 210, programmable electronic device 110 installs the received image. Device 110 may install the received image in any suitable manner.

Programmable electronic device 110 for one or more embodiments may install the received image by storing the received image at a predetermined location in, for example, non-volatile memory or storage. Device 110 for one or more embodiments may overwrite software for an operating system currently residing on device 110 with the received image.

By automatically identifying at least a portion of a hardware configuration and an operating system for programmable electronic device 110 for block 202 and automatically generating an image request based at least in part on both the identified hardware configuration and the identified operating system, device 110 for one or more embodiments may help allow a user of device 110 to install operating system software with reduced or minimized concern for the user to identify specifically which operating system software is to be installed on device 110 and/or where that operating system software may be found. Device 110 for one or more embodiments may therefore help save a user's time from having to investigate how to perform the installation and/or help reduce or minimize customer support for the installation. Device 110 for one or more embodiments may therefore also help to reduce or minimize user error in performing the installation.

Programmable electronic device 110 for one or more embodiments may perform one or more operations for one or more of blocks 206, 208, and 210 automatically. Device 110 for one or more embodiments may perform one or more operations for all of blocks 206, 208, and 210 automatically. Device 110 for one or more embodiments may prompt a user of device 110 to confirm one or more operations for one or more of blocks 206, 208, and 210 are to be performed.

Programmable electronic device 110 for one or more embodiments may perform operation(s) for one or more of blocks 202, 204, 206, 208, and 210 autonomously, that is without receiving assistance from a user or an external computer, for example, to perform such operation(s). Device 110 for one or more embodiments may perform operations for all of blocks 202, 204, 206, 208, and 210 autonomously. Device 110 for one or more embodiments may perform one or more operations for one or more of blocks 202, 204, 206, 208, and 210 with assistance from an external computer, for example, in communication with network(s) 130. As one example, device 110 for one embodiment may request assistance from an external computer to help identify at least a portion of a hardware configuration for block 202 based on the identification of a component of device 110.

Programmable electronic device 110 for one or more embodiments may perform operations for flow diagram 200 in response to a request by a user of device 110. Device 110 for one or more embodiments may perform operation(s) for block 202 at any suitable time, such as at bootup for example, and perform operations for blocks 204, 206, 208, and 210 in response to a user request. Device 110 for one or more embodiments may perform operations for blocks 202 and 204 at any suitable time, such as at bootup for example, and perform operations for blocks 206, 208, and 210 in response to a user request.

Alternative Automatic Operating System Image Installation

Figure 3:
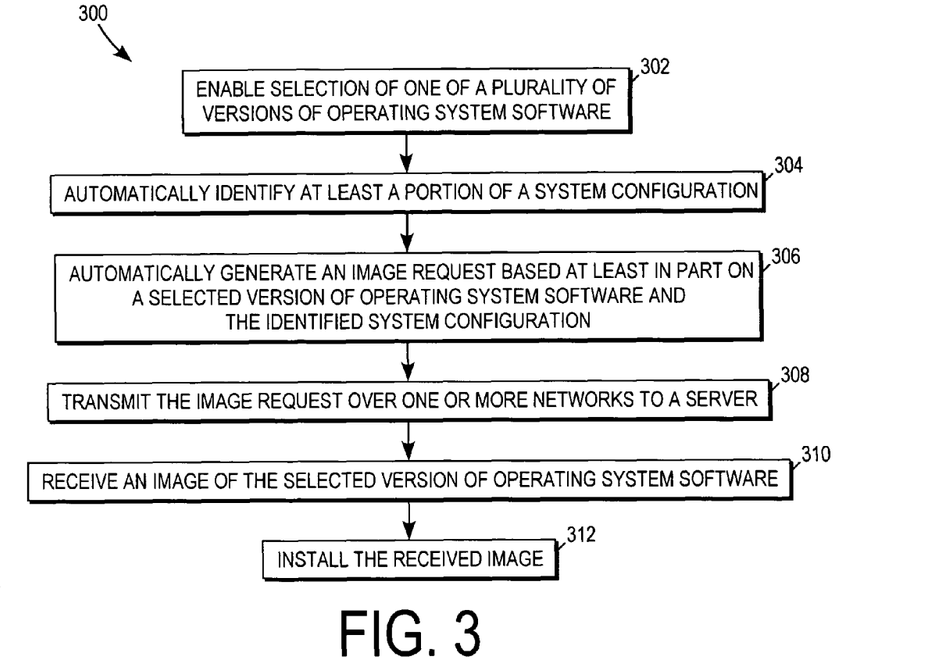
FIG. 3 illustrates, for one or more embodiments, another flow diagram for a programmable electronic device to request an operating system software image from a server and to receive and install the operating system software image on the programmable electronic device.

Programmable electronic device 110 for one or more embodiments may request, receive, and install an operating system software image in accordance with a flow diagram 300 of FIG. 3.

For block 302, programmable electronic device 110 enables selection of one of a plurality of versions of operating system software. Device 110 may enable selection of any suitable one or more versions of operating system software in any suitable manner.

Programmable electronic device 110 for one or more embodiments may enable selection of any one of any suitable combination of the following versions of operating system software: the original version of operating system software at the time of manufacture and/or purchase of device 110, the version of operating system software currently installed on device 110, the version of operating system software installed just prior to the version currently installed on device 110, a next upgrade version of operating system software, the most recently available upgrade version of operating system software, and any suitable alternative language version, such as German, Spanish, and/or French versions for example, of any suitable version of operating system software.

Figure 4:
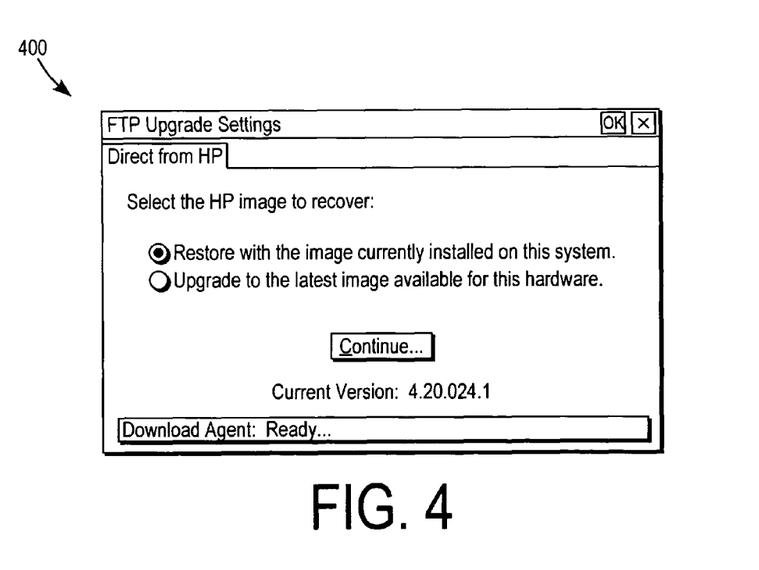
FIG. 4 illustrates, for one or more embodiments, an example graphical user interface for a user of a programmable electronic device to select one of a plurality of versions of operating system software for installation.

Programmable electronic device 110 for one or more embodiments may prompt a user of device 110 to select one of a plurality of versions of operating system software and to receive the user's selection in any suitable manner. Device 110 for one or more embodiments may prompt for and receive the user's selection by displaying on a display of device 110 a graphical user interface instructing the user to select one of a plurality of versions of operating system software and identifying a selection of the user in response to the user's interaction with device 110. FIG. 4 illustrates an example graphical user interface 400 for a user of device 110 to select either the version of operating system software currently installed on device 110 or the most recently available upgrade version of operating system software.

For block 304, programmable electronic device 110 automatically identifies at least a portion of a system configuration for device 110. Device 110 may automatically identify at least a portion of any suitable system configuration for device 110 in any suitable manner.

Programmable electronic device 110 for one or more embodiments may identify at least a portion of a system configuration by identifying at least a portion of a hardware configuration for device 110. Device 110 for one or more embodiments may identify at least a portion of a hardware configuration similarly as described for block 202 of FIG. 2. Device 110 for one or more embodiments may identify at least a portion of a system configuration by identifying an operating system for device 110. Device 110 for one or more embodiments may identify an operating system similarly as described for block 202 of FIG. 2. Device 110 for one or more embodiments may identify at least a portion of a system configuration by identifying both at least a portion of a hardware configuration and an operating system for device 110.

Programmable electronic device 110 for one or more embodiments may identify an operating system for device 110 by identifying an image file name for the operating system. Device 110 for one embodiment may identify an operating system currently resident on device 110 by identifying an image file name for the currently resident operating system. Device 110 for one or more embodiments may identify an operating system for device 110 by identifying an image file name for the operating system based on the operating system software version selected for block 302. Device 110 for one embodiment may identify an operating system currently resident on device 110 by identifying an image file name for the currently resident operating system based on the operating system software version selected for block 302.

For block 306, programmable electronic device 110 automatically generates an image request based at least in part on a selected version of operating system software and the identified system configuration. Device 110 may automatically generate any suitable image request based at least in part on a selected version of operating system software and the identified system configuration in any suitable manner.

Programmable electronic device 110 for one or more embodiments may generate an image request that identifies at least the identified system configuration and the selected version of operating system software in any suitable manner to help identify an image of the selected version of operating system software for installation on device 110. Device 110 for one embodiment may generate an image request that identifies the identified system configuration, for example, by a name and/or an identification code. Device 110 for one embodiment may generate an image request that identifies device 110 itself, for example, by a name and/or an identification code. Device 110 for one embodiment may generate an image request that identifies an operating system for device 110, for example, by a name and/or an identification code. Device 110 for one embodiment may generate an image request that identifies the selected version of operating system software, for example, by a name and/or an identification code.

Programmable electronic device 110 for one or more embodiments may itself automatically identify an image of the selected version of operating system software for installation on device 110 based at least in part on the identified system configuration and the selected version of operating system software in any suitable manner and generate an image request that identifies the identified image. Device 110 may generate an image request that identifies the identified image in any suitable manner. Device 110 for one embodiment may generate an image request that identifies the identified image, for example, by a name and/or an identification code.

Programmable electronic device 110 for one or more embodiments may generate an image request that identifies a path and/or an image file name on server 120 based at least in part on a selected version of operating system software and the identified system configuration. Device 110 for one or more embodiments may generate an image request having a uniform resource identifier (URI), such as a uniform resource locator (URL) for example, based at least in part on a selected version of operating system software and the identified system configuration to identify a file having the image of the selected version of operating system software for installation on device 110. In one embodiment, the URL scheme is a file transfer protocol scheme. Device 110 for one or more embodiments may generate a file transfer protocol (FTP) request based at least in part on a selected version of operating system software and the identified system configuration to identify a file having the image of the selected version of operating system software for installation on device 110.

Programmable electronic device 110 for one or more embodiments for block 306 may automatically identify server 120 in any suitable manner. Device 110 for one or more embodiments may automatically identify server 120 similarly as described for block 204 of FIG. 2.

For block 308, programmable electronic device 110 transmits the image request over network(s) 130 to server 120. Device 10 may transmit the image request in any suitable manner over any suitable network(s) 130 to server 120.

Programmable electronic device 110 and/or server 120 may communicate with network(s) 130 in any suitable manner. Device 110 and/or server 120 for one or more embodiments may communicate with network(s) 130 similarly as described for block 206 of FIG. 2.

Server 120 may comprise any suitable hardware and/or software to receive the image request from device 110 in any suitable manner and in response to the received image request to perform any suitable one or more operations to have an image of software identified in accordance with the received image request transmitted over network(s) 130 to device 110. Server 120 for one or more embodiments may perform operations similarly as described for flow diagram 200 of FIG. 2.

For block 310, programmable electronic device 110 receives an image of the selected version of operating system software for installation on device 110. Device 110 may receive the image in any suitable manner.

For block 312, programmable electronic device 110 installs the received image. Device 110 may install the received image in any suitable manner. Device 110 for one or more embodiments may install the received image similarly as described for block 210 of FIG. 2.

By enabling selection of one of a plurality of versions of operating system software for block 302, automatically identifying at least a portion of a system configuration for programmable electronic device 110 for block 304, and automatically generating an image request based at least in part on a selected version of operating system software and the identified system configuration for block 306, device 110 for one or more embodiments may help allow a user of device 110 to select and install a desired version of operating system software with reduced or minimized concern for the user to identify specifically which operating system software is to be installed on device 110 and/or where that operating system software may be found. Device 110 for one or more embodiments may therefore help save a user's time from having to investigate how to perform the installation and/or help reduce or minimize customer support for the installation. Device 110 for one or more embodiments may therefore also help to reduce or minimize user error in performing the installation.

Programmable electronic device 110 for one or more embodiments may perform one or more operations for one or more of blocks 308, 310, and 312 automatically. Device 110 for one or more embodiments may perform one or more operations for all of blocks 308, 310, and 312 automatically. Device 110 for one or more embodiments may prompt a user of device 110 to confirm one or more operations for one or more of blocks 308, 310, and 312 are to be performed.

Programmable electronic device 110 for one or more embodiments may perform operation(s) for one or more of blocks 304, 306, 308, 310, and 312 autonomously, that is without receiving assistance from a user or an external computer, for example, to perform such operation(s). Device 110 for one or more embodiments may perform operations for all of blocks 304, 306, 308, 310, and 312 autonomously. Device 110 for one or more embodiments may perform one or more operations for one or more of blocks 304, 306, 308, 310, and 312 with assistance from an external computer, for example, in communication with network(s) 130. As one example, device 110 for one embodiment may request assistance from an external computer to help identify at least a portion of a system configuration for block 304 based on the identification of a component of device 110.

Programmable electronic device 110 for one or more embodiments may perform operations for flow diagram 300 in response to a request by a user of device 110. Device 110 for one or more embodiments may perform operation(s) for block 304 at any suitable time, such as at bootup for example, and perform operations for blocks 302, 306, 308, 310, and 312 in response to a user request.

Example Programmable Electronic Device

Programmable electronic device 110 may comprise any suitable hardware and software to help request and receive an operating system software image for installation on device 110.

Figure 5:
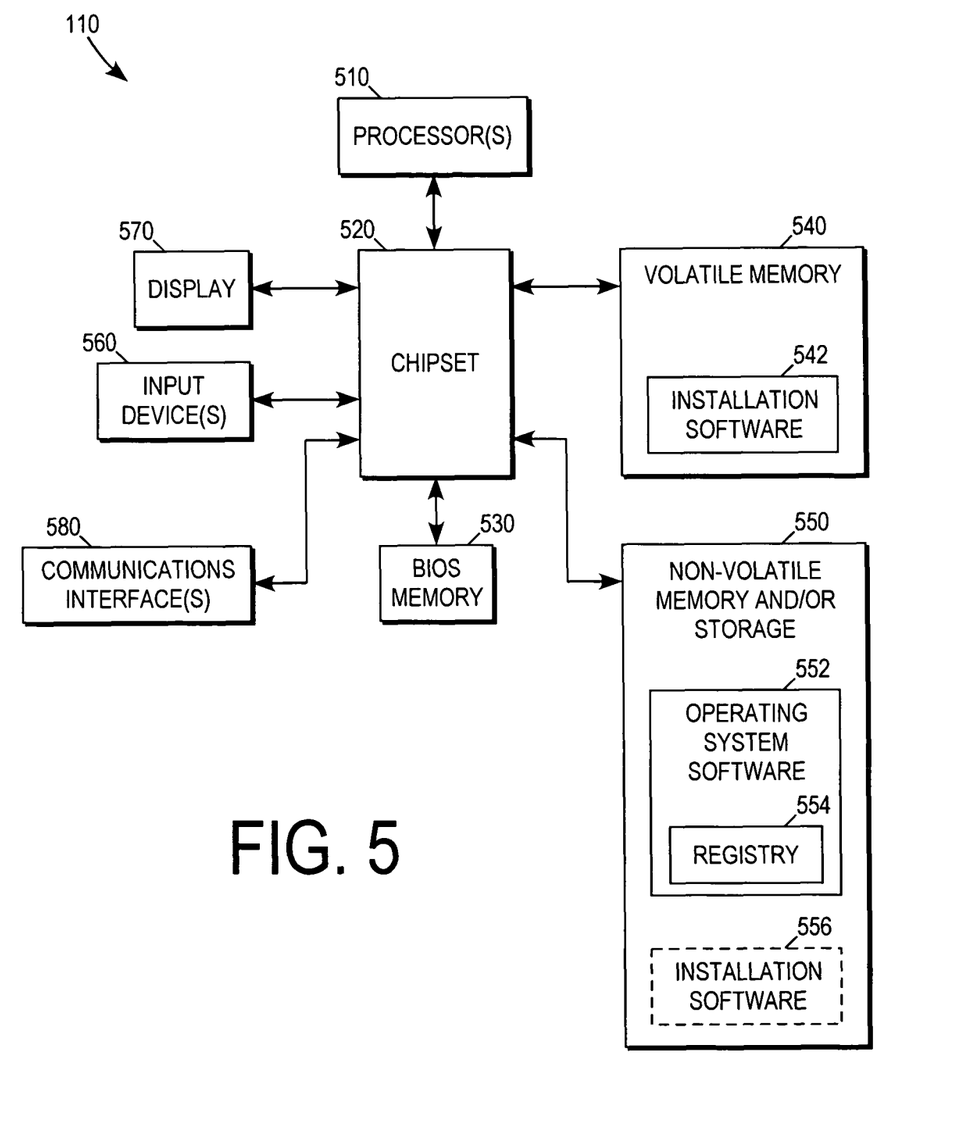
FIG. 5 illustrates, for one or more embodiments, a block diagram of components of at least a portion of an example programmable electronic device.

Programmable electronic device 110 for one or more embodiments may comprise, as illustrated in FIG. 5, one or more processors 510, a chipset 520 coupled to processor(s) 510, a basic input/output system (BIOS) memory 530 coupled to chipset 520, volatile memory 540 coupled to chipset 520, non-volatile memory and/or storage 550 coupled to chipset 520, one or more input devices 560 coupled to chipset 520, a display 570 coupled to chipset 520, and one or more communications interfaces 580 coupled to chipset 520.

Chipset 520 for one or more embodiments may comprise any suitable one or more interface controllers to provide for any suitable communications link to processor(s) 510 and/or to any suitable device or component in communication with chipset 520.

Chipset 520 for one or more embodiments may comprise a firmware controller to provide an interface to BIOS memory 530. BIOS memory 530 may be used to store any suitable system and/or video BIOS software. BIOS memory 530 may comprise any suitable non-volatile memory, such as flash memory for example.

Chipset 520 for one or more embodiments may comprise one or more memory controllers to provide an interface to volatile memory 540. Volatile memory 540 may be used to load and store data and/or instructions, for example, for device 110. Volatile memory 540 may comprise any suitable volatile memory, such as suitable dynamic random access memory (DRAM) for example, of any suitable capacity.

Chipset 520 for one or more embodiments may comprise one or more input/output (I/O) controllers to provide an interface to non-volatile memory and/or storage 550, input device(s) 560, and communications interface(s) 580. Non-volatile memory and/or storage 550 may be used to store data and/or instructions, for example. Non-volatile memory and/or storage 550 for one or more embodiments, as illustrated in FIG. 5, may be used to store operating system software 552 for device 110. Non-volatile memory and/or storage 550 for one or more embodiments may comprise any suitable non-volatile memory and/or storage of any suitable capacity. Non-volatile memory and/or storage 550 for one or more embodiments may comprise any suitable non-volatile memory, such as flash memory for example, of any suitable capacity. Non-volatile memory and/or storage 550 for one or more embodiments may comprise any suitable non-volatile storage, such as one or more hard disk drives (HDDs), one or more compact disc (CD) drives, and/or one or more digital versatile disc (DVD) drives for example, of any suitable capacity. Input device(s) 560 may be used to help a user, for example, to input information into, interact with, and/or control device 110. Input device(s) 560 may comprise any suitable input device(s), such as a keyboard, a keypad, one or more control buttons, a touch screen device, a mouse, a touch pad, and/or any other suitable cursor control device. Communications interface(s) 580 provide an interface for device 110 to communicate over network(s) 130 and/or with any other suitable device. Communications interface(s) 580 may comprise any suitable hardware and/or firmware. Communications interface(s) 580 for one or more embodiments may comprise, for example, a network adapter, a wireless network adapter, a telephone modem, and/or a wireless modem.

Chipset 520 for one or more embodiments may comprise a graphics controller to provide an interface to display 570. Display 570 may comprise any suitable display such as, for example and without limitation, a cathode ray tube (CRT) or a flat panel display such as, for example and without limitation, a liquid crystal display (LCD), an electroluminescent (EL) display, a plasma display, or a field emission display (FED).

Although described in connection with residing on chipset 520, one or more controllers of chipset 520 may be integrated with one or more of processor(s) 510, allowing processor(s) 510 to communicate with one or more devices or components directly. As one example, one or more memory controllers for one embodiment may be integrated with one or more of processor(s) 510, allowing processor(s) 510 to communicate with volatile memory 540 directly.

Figure 6:
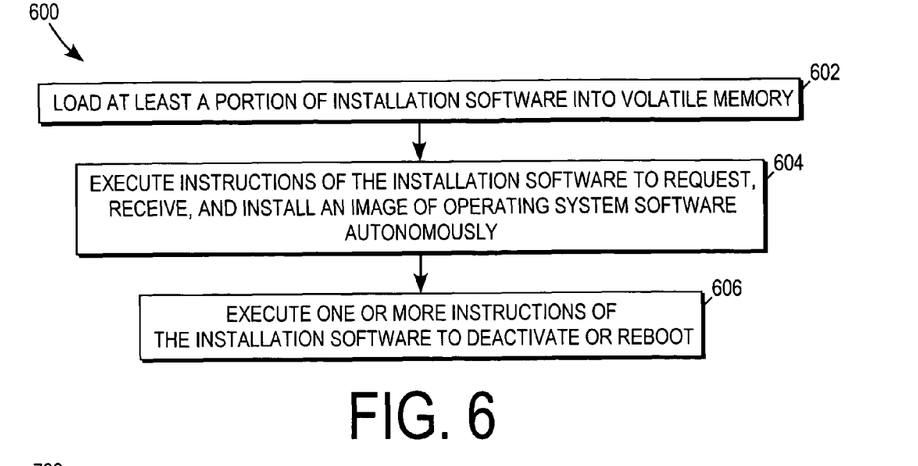
FIG. 6 illustrates, for one or more embodiments, a flow diagram for a programmable electronic device to request, receive, and install an operating system software image.

Programmable electronic device 110 of FIG. 5 for one or more embodiments may help request and receive an operating system software image for installation on device 110 in accordance with a flow diagram 600 of FIG. 6.

For block 602 of FIG. 6, processor(s) 510 load at least a portion of installation software 542 into volatile memory 540. Processor(s) 510 may load at least a portion of installation software 542 into volatile memory 540 in any suitable manner.

Processor(s) 510 for one or more embodiments may load into volatile memory 540 at least a portion of installation software 542 from installation software stored in non-volatile memory and/or storage 550. The at least a portion of installation software 542 for one or more embodiments may be loaded into volatile memory 540 from operating system software 552. The at least a portion of installation software 542 for one or more embodiments may be loaded into volatile memory 540 as part of the kernel of operating system software 552. The at least a portion of installation software 542 for one or more embodiments may optionally be loaded into volatile memory 540 from operating system software 552 and/or installation software 556 stored in non-volatile memory and/or storage 550 separately from operating system software 552. The at least a portion of installation software 542 for one or more embodiments may optionally be loaded into volatile memory 540 from operating system software 552 and/or installation software stored external to device 110, for example in an application server in communication with network(s) 130, and downloaded by processor(s) 510 through communications interface(s) 580.

Installation software 542 may comprise any suitable instructions in any suitable language that may be read and executed by processor(s) 510 in any suitable manner to request, receive, and install an operating system software image.

Processor(s) 510 for one or more embodiments for block 602 may initially load all of installation software 542 into volatile memory 540. Processor(s) 510 for one or more other embodiments for block 602 may initially load only a portion of installation software 542 into volatile memory 540 and then load one or more portions of installation software 542 into volatile memory 540 in accordance with any suitable loading and/or swapping technique as processor(s) 510 perform operations to request, receive, and install an operating system software image. Processor(s) 510 for one or more embodiments for block 602 may move or copy at least a portion of installation software 556 from operating system software 552 to a location in non-volatile memory and/or storage 550 to help processor(s) 510 avoid overwriting instructions of installation software 556 as processor(s) 510 install an image of operating system software.

For block 604, processor(s) 510 execute instructions of installation software 542 to request, receive, and install an image of operating system software.

Processor(s) 510 for one or more embodiments may execute instructions of installation software 542 loaded into volatile memory 540 to perform operations for flow diagram 200 of FIG. 2. Processor(s) 510 for one or more embodiments may execute one or more instructions of installation software 542 to perform one or more operations for each block 202, 204, 206, 208, and 210 of FIG. 2.

Processor(s) 510 for one or more embodiments may execute one or more instructions of installation software 542 to identify for block 202 at least a portion of a hardware configuration for device 110 based on any suitable information in BIOS software stored in BIOS memory 530. Processor(s) 510 for one or more embodiments may execute one or more instructions of installation software 542 to identify for block 202 an operating system for device 110 based on any suitable information in a registry 554 of operating system software 552 stored in non-volatile memory and/or storage 550.

Processor(s) 510 for one or more embodiments may execute one or more instructions of installation software 542 to transmit for block 206 an image request over network(s) 130 using one or more of communications interface(s) 580.

Processor(s) 510 for one or more embodiments may execute one or more instructions of installation software 542 to receive for block 208 an image over network(s) 130 using one or more of communications interface(s) 580. Processor(s) 510 for one or more embodiments may store the received image into volatile memory 540 and/or non-volatile memory and/or storage 550.

Processor(s) 510 for one or more embodiments may execute one or more instructions of installation software 542 to install an image for block 210 in non-volatile memory and/or storage 550. Processor(s) 510 for one or more embodiments may install the received image for block 210 by storing the received image at a predetermined location in non-volatile memory and/or storage 550. Processor(s) 510 for one or more embodiments may install the received image for block 210 by overwriting operating system software 552 in non-volatile memory and/or storage 550 with the received image.

Processor(s) 510 for one or more embodiments may receive for block 208 all of an image prior to installing the received image for block 210.

Processor(s) 510 for one or more embodiments may install the received image for block 210 as the image is received for block 208. Processor(s) 510 for one or more embodiments may receive and store in volatile memory 540 and/or non-volatile memory and/or storage 550 portions of an image and install received portions of the image as processor(s) 510 continue to receive more portions of the image.

Processor(s) 510 for one or more embodiments may execute instructions of installation software 542 loaded into volatile memory 540 to perform operations for flow diagram 300 of FIG. 3. Processor(s) 510 for one or more embodiments may execute one or more instructions of installation software 542 to perform one or more operations for each block 302, 304, 306, 308, 310, and 312 of FIG. 3.

Processor(s) 510 for one or more embodiments may execute one or more instructions of installation software 542 to enable for block 302 selection of one of a plurality of versions of operating system software by a user using one or more of input device(s) 560. Processor(s) 510 for one or more embodiments may execute one or more instructions of installation software 542 to prompt for and receive for block 302 a user's selection of one of a plurality of versions of operating system software. Processor(s) 510 may prompt for and receive the user's selection in any suitable manner, such as by displaying on display 570 a graphical user interface instructing a user to select one of a plurality of versions of operating system software and identifying a selection of the user in response to the user's interaction with the graphical user interface using one or more of input device(s) 560.

Processor(s) 510 for one or more embodiments may execute one or more instructions of installation software 542 to identify for block 304 at least a portion of a system configuration for device 110 based on any suitable information in BIOS software stored in BIOS memory 530 and/or based on any suitable information in registry 554 of operating system software 552 stored in non-volatile memory and/or storage 550.

Processor(s) 510 for one or more embodiments may execute one or more instructions of installation software 542 to transmit for block 308 an image request over network(s) 130 using one or more of communications interface(s) 580.

Processor(s) 510 for one or more embodiments may execute one or more instructions of installation software 542 to receive for block 310 an image over network(s) 130 using one or more of communications interface(s) 580.

Processor(s) 510 for one or more embodiments may execute one or more instructions of installation software 542 to install an image for block 312 in non-volatile memory and/or storage 550.

Processor(s) 510 for one or more embodiments may receive an image for block 310 and install an image for block 312 similarly as described for blocks 208 and 210, respectively, of FIG. 2.

Processor(s) 510 for one or more embodiments, as illustrated in FIG. 6, may execute one or more instructions of installation software 542 for block 604 to perform operation(s) to request, receive, and/or install an image of operating system software autonomously, that is without receiving assistance from a user or an external computer, for example, to perform such operation(s). Processor(s) 510 for one or more embodiments may execute one or more instructions of installation software 542 for block 604 to perform one or more operations to request, receive, and/or install an image of operating system software with assistance from an external computer, for example, in communication with network(s) 130.

For block 606, processor(s) 510 execute one or more instructions of installation software 542 to deactivate or reboot device 110. Processor(s) 510 may execute one or more instructions of installation software 542 to deactivate or reboot device 110 in any suitable manner.

Processor(s) 510 for one or more embodiments may execute one or more instructions of installation software 542 to deactivate device 110 automatically after installation of the image. Processor(s) 510 for one or more embodiments may execute one or more instructions of installation software 542 to reboot device 110 automatically after installation of the image to execute the newly installed operating system software.

Processor(s) 510 for one or more embodiments may execute one or more instructions of installation software 542 to enable selection by a user using one or more of input device(s) 560 to deactivate or reboot device 110 after installation of the image. Processor(s) 510 may enable such selection at any suitable time, such as prior to any operations for block 604 or after operations for block 604 for example. Processor(s) 510 for one or more embodiments may prompt a user of device 110 to select to deactivate or reboot device 110 after installation of the image and then receive the user's selection. Processor(s) 510 may prompt for and receive the user's selection in any suitable manner, such as by displaying on display 570 a graphical user interface instructing a user to select the deactivation or reboot operation and identifying a selection of the user in response to the user's interaction with the graphical user interface using one or more of input device(s) 560.

Although described in connection with device 110 of FIG. 5, installation software 542 may comprise any suitable instructions that may be stored on any suitable machine-readable medium. The instructions of installation software 542 may be in any suitable language that may be directly or indirectly performed by any suitable machine.

Device 110 of FIG. 5 for one or more other embodiments may not comprise volatile memory 540 and may therefore load instructions of installation software into processor(s) 510 directly from non-volatile memory and/or storage 550. Device 110 of FIG. 5 for one or more other embodiments may comprise any suitable one or more output devices, such as a speaker for example, in addition to or in lieu of display 570.

Example Automatic Operating System Image Installation

Figure 7:
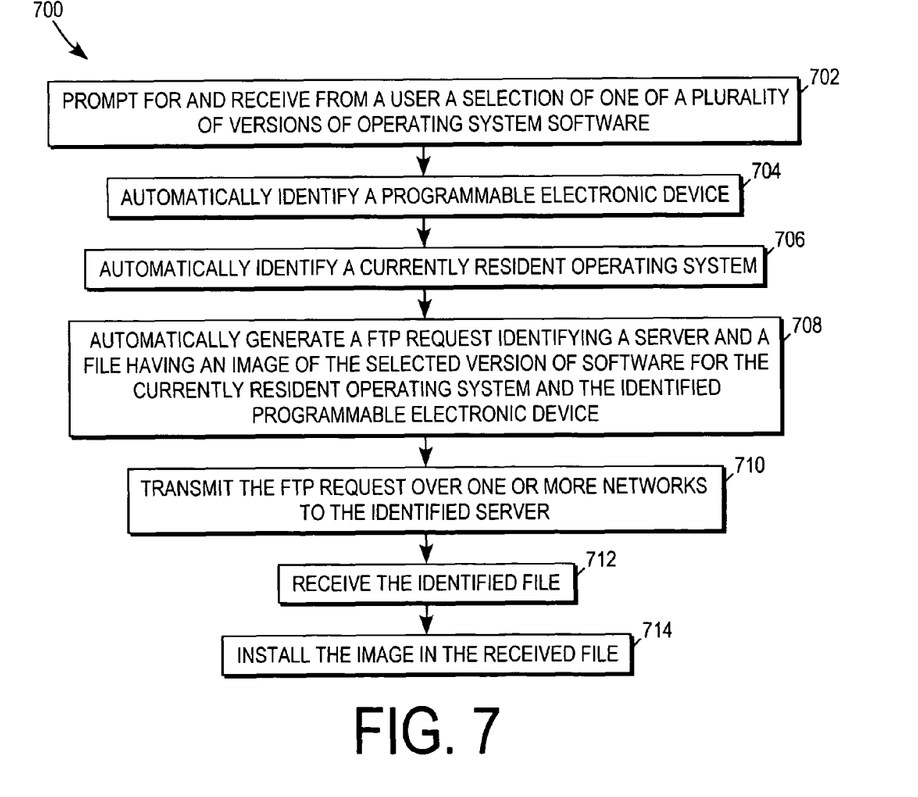
FIG. 7 illustrates, for one or more embodiments, another flow diagram for a programmable electronic device to request an operating system software image from a server and to receive and install the operating system software image on the programmable electronic device.

Programmable electronic device 110 for one or more embodiments may request, receive, and install an operating system software image in accordance with a flow diagram 700 of FIG. 7.

For block 702, programmable electronic device 110 prompts for and receives from a user a selection of one of a plurality of versions of operating system software. Device 110 for one or more embodiments may prompt for and receive from a user a selection of one of a plurality of versions of operating system software similarly as described for block 302 of FIG. 3.

For block 704, programmable electronic device 110 automatically identifies itself. Device 110 for one or more embodiments may automatically identify itself similarly as described for block 202 of FIG. 2.

Programmable electronic device 110 for one or more embodiments may identify itself by identifying a system identification code located within a System Management Basic Input/Output System (SMBIOS) structure in BIOS software designed in accordance with the SMBIOS Reference Specification Version 2.3. The system identification code for one embodiment may be located in a Type 2 Base Board Information record as illustrated in the following example.

Type=2
Manufacturer=Hewlett-Packard
Product=<SystemIdentificationCode>
Version=<Version>
Serial Number=<Chassis Serial Number>

The SystemIdentificationCode value for one or more embodiments is an alphanumeric string value.

For block 706, programmable electronic device 110 automatically identifies an operating system currently resident on device 110. Device 110 for one or more embodiments may automatically identify the currently resident operating system similarly as described for block 304 of FIG. 3.

Programmable electronic device 110 for one or more embodiments may identify the currently resident operating system by identifying an image file name in a registry for the currently resident operating system. Device 110 for one or more embodiments may identify the currently resident operating system by identifying in a registry for the currently resident operating system an image file name based on the operating system software version selected for block 702.

For block 708, programmable electronic device 110 automatically generates a file transfer protocol (FTP) request identifying server 120 and a file having an image of the selected version of software for the currently resident operating system and the identified programmable electronic device. Device 110 for one or more embodiments may automatically generate such a FTP request similarly as described for block 306 of FIG. 3.

Programmable electronic device 110 for one or more embodiments for blocks 706 and 708 may identify in a registry for the currently resident operating system one or more values identifying server 120, a name of a file on server 120 having an image of the version of operating system software currently installed on device 110, one or more other names of a file on server 120 having an image of another version of software for the currently resident operating system, one or more paths on server 120 where one or more files having an image of a version of software for the currently resident operating system reside, and/or one or more security credentials for the FTP request.

As one example, the following values may be defined in a registry for the currently resident operating system.

[HKLM\Software\HP\WBT\HPDirect]
ImageFileName="CE__4.20.024.1.img"
ImageUpgradeFileName="CE__4.20.024.1_up.img"
FTPServerAddress="ftp.compaq.com"
FTPUserName="anonymous"
FTPpwd=password
PrefixPath="pub/TCImages"

For this example, the naming convention for the ImageFileName value is "OS_ImageVersion.img" and for the ImageUpgradeFileName value is "OS_ImageVersion_up.img", where OS identifies the operating system currently resident on device 110 and ImageVersion identifies an image version of the operating system software currently installed on device 110. ImageVersion may identify, for example, the version of the operating system currently resident on device 110 and optionally the build number for the operating system software currently installed on device 110. The ImageVersion may optionally identify minor build numbers and/or sub-minor build numbers. As one example, "CE__4.20.024.1.img" may refer to version 4.20 (build 24.1) for the Windows CE® operating system. As one example, "CE__4.20.024.1_up.img" may refer to an upgrade image version to version 4.20 (build 24.1) for the Windows CE® operating system, such as an image version having Windows CE® operating system software version 4.20 (build 45) for example.

The naming convention for the ImageFileName value may alternatively be "OS_ImageVersion_Language.img" and for the ImageUpgradeFileName value may be "OS_ImageVersion_Language_up.img", where Language identifies the language version of the operating system software currently installed on device 110. As one example, "CE__4.20.024.1_GER.img" may refer to the German version of version 4.20 (build 24.1) for the Windows CE operating system. Such a naming convention may optionally not use the Language suffix for a predominant language version, such as English for example, of the operating system software.

Programmable electronic device 110 for one or more embodiments for this example may identify for block 706 the ImageFileName value if the version of operating system software currently installed on device 110 is selected for block 702 or may identify for block 706 the ImageUpgradeFileName value if an upgrade version of operating system software is selected for block 702.

Programmable electronic device 110 for one or more embodiments for this example may generate a file transfer protocol (FTP) request for block 708 using values identified for blocks 704 and 706 in accordance with the following FTP request naming convention if the version of operating system software currently installed on device 110 is selected for block 702:

FTPServerAddress/PrefixPath/SystemIdentificationCode/ImageFileName or in accordance with the following FTP request naming convention if an upgrade version of operating system software is selected for block 702.

FTPServerAddress/PrefixPath/SystemIdentificationCode/ImageUpgradeFileName

For block 710, programmable electronic device 110 transmits the FTP request over network(s) 130 to server 120. Device 110 may transmit the FTP request in any suitable manner over any suitable network(s) 130 to server 120.

For block 712, programmable electronic device 110 receives the file identified by the FTP request. Device 110 may receive the identified file in any suitable manner.

For block 714, programmable electronic device 110 installs the image in the received file. Device 110 may install the image in any suitable manner. Device 110 for one or more embodiments may install the image similarly as described for block 210 of FIG. 2.

The naming convention in this example for one or more embodiments may help allow any desired upgrade of a version of currently installed operating system software to be made available to device 110 by storing on server 120 an image of the desired upgrade version of software under the same file name as the ImageUpgradeFileName value stored on device 110. If the version of currently installed operating system software does not have any available upgrades, the same version of the currently installed operating system software may optionally be stored on server 120 under the same file name as the ImageUpgradeFileName value stored on device 110 to restore the version of currently installed operating system software on device 110 if an upgrade version of operating system software is selected for block 702.

In the foregoing description, one or more embodiments have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   automatically identifying a hardware configuration and an operating system of a programmable electronic device;
   generating an image request in the form of a uniform resource locator (URL), wherein the URL is based at least in part on the identified hardware configuration and the identified operating system, wherein the URL includes a path to the image;
   transmitting the image request to a server networked to the programmable electronic device;
   receiving an image of software for the identified operating system in response to the image request; and
   installing the received image for the programmable electronic device, wherein the identifying, generating, transmitting, and receiving are performed by the programmable electronic device.

2. The method of claim 1, wherein the hardware configuration is retrieved from a basic input/output system (BIOS) memory.

3. The method of claim 1, wherein the operating system is identified from an operating system registry.

4. The method of claim 1, wherein the URL includes a scheme.

5. The method of claim 4, wherein the scheme is a file transfer protocol (FTP) scheme, wherein the URL identifies a file corresponding to the image for the identified operating system.

6. A method comprising:
   enabling selection of one of a plurality of versions of operating system software for a programmable electronic device;
   automatically identifying a hardware configuration of the programmable electronic device;
   generating an image request in the form of a uniform resource locator (URL), wherein the URL is based at least in part on the identified hardware configuration and the selected operating system version, wherein the URL includes a path to the image;
   transmitting the image request to a server networked to the programmable electronic device;
   receiving an image of software for the selected operating system version in response to the image request; and
   installing the received image for the programmable electronic device, wherein the identifying, generating, transmitting, and receiving are performed by the programmable electronic device.

7. The method of claim 6, wherein the plurality of versions of operating system software includes a version currently installed for the programmable electronic device.

8. The method of claim 6, wherein the URL includes a scheme.

9. The method of claim 8, wherein the scheme is a file transfer protocol (FTP) scheme, wherein the URL identifies a file corresponding to the image for the selected version of the operating system.

10. A programmable electronic device comprising:
    a nonvolatile memory to store installation software;
    at least one communications interface enabling network communication; and
    at least one processor to execute instructions of the installation software to identify an operating system and at least a portion of a hardware configuration, to generate an image request in the form of a uniform resource locator (URL) including a path to the image based at least in part on the identified hardware configuration and operating system, to transmit the image request over a network to a server using the at least one communications interface, to receive an image of software for the identified operating system using the at least one communications interface, and to install the received image in the nonvolatile memory.

11. The programmable electronic device of claim 10, wherein the at least one processor identifies the hardware configuration at least in part from information retrieved from a basic input/output system (BIOS) memory.

12. The programmable electronic device of claim 10, wherein the at least one processor identifies the operating system at least in part from information in an operating system registry stored in the nonvolatile memory.

13. The programmable electronic device of claim 10, wherein the URL includes a scheme.

14. The programmable electronic device of claim 13 wherein the scheme is a file transfer protocol (FTP) scheme, wherein the URL identifies a file corresponding: to the image for the identified operating system.

15. A programmable electronic device comprising:
    a nonvolatile memory to store installation software;
    at least one input device;
    at least one communications interface enabling network communication; and
    at least one processor to execute instructions of the installation software to identify an operating system and at least a portion of a hardware configuration, to enable selection of one of a plurality of versions of the operating system using the at least one input device, to generate an image request in the form of a uniform resource locator (URL) including a path to the image based at least in part on the identified hardware configuration and the selected version of operating system, to transmit the image request over a network to a server using the at least one communications interface, to receive an image of software for the selected version of operating system using the at least one communications interface, and to install the received image in the nonvolatile memory.

16. The programmable electronic device of claim 15, wherein the plurality of versions of operating system software includes a version currently installed for the programmable electronic device.

17. The programmable electronic device of claim 15, wherein the URL includes a scheme.

18. The programmable electronic device of claim 17, wherein the scheme is a file transfer protocol (FTP) scheme, wherein the URL identifies a file corresponding to the image for the selected version of operating system.

19. A medium storing program instructions executable by a programmable electronic device to perform a method comprising:
    automatically identifying a hardware configuration and an operating system of a programmable electronic device;
    generating an image request in the form of a uniform resource locator (URL), wherein the URL is based at least in part on the identified hardware configuration and the identified operating system, wherein the URL includes a path to the image;
    transmitting the image request to a server networked to the programmable electronic device;
    receiving an image of software for the identified operating system in response to the image request; and
    installing the received image for the programmable electronic device.

20. The medium of claim 19, wherein the URL includes a file transfer protocol (FTP) scheme, wherein the URL identifies a file corresponding to the image for the identified operating system.

21. A medium storing program instructions executable by a programmable electronic device to perform a method comprising:
- enabling selection of one of a plurality of versions of operating system software;
- identifying a hardware configuration and an operating system of a programmable electronic device;
- generating an image request in the form of a uniform resource locator (URL), wherein the URL is based at least in part on the identified hardware configuration and the selected version of operating system, wherein the URL includes a path to the image;
- transmitting the image request to a server networked to the programmable electronic device;
- receiving an image in response to the image request; and
- installing the received image for the programmable electronic device.

22. The medium of claim 21, wherein the plurality of versions of operating system software includes a version currently installed for the programmable electronic device.

23. The medium of claim 21, wherein the URL includes a file transfer protocol (FTP) scheme, wherein the URL identifies a file corresponding to the image for the selected version of operating system.

24. A programmable electronic device comprising:
- means for identifying at least a portion of a hardware configuration and an operating system for the programmable electronic device;
- means for generating an image request in the form of a uniform resource locator (URL), wherein the URL is based at least in part on the identified hardware configuration and the identified operating system, wherein the URL includes a path to the image;
- means for transmitting the image request to a server networked to the programmable electronic device;
- means for receiving an image of software for the identified operating system in response to the image request; and
- means for installing the received image for the programmable electronic device.

25. A programmable electronic device comprising:
- means for enabling selection of one of a plurality of versions of operating system software;
- means for identifying at least a portion of a hardware configuration for the programmable electronic device;
- means for generating an image request in the form of a uniform resource locator (URL), wherein the URL is based at least in part on the identified hardware configuration and the selected version of the operating system, wherein the URL includes a path to the image;
- means for transmitting the image request to a server networked to the programmable electronic device;
- means for receiving an image in response to the image request; and
- means for installing the received image for the programmable electronic device.

26. A method comprising:
- identifying a hardware configuration and an operating system for a programmable electronic device;
- generating an image request in the form of a uniform resource locator (URL), wherein the URL is based at least in part on the identified hardware configuration and the identified operating system, wherein the URL includes a path to the image; and
- transmitting the image request network coupling the programmable electronic device and a server, wherein the identifying, generating, and transmitting are performed by the programmable electronic device.

27. The method of claim 26 wherein identifying the operating system includes selecting the operating system from one of a plurality of versions of operating system software.

28. The method of claim 26 wherein the URL specifies a file corresponding to the image for the identified operating system.

29. A programmable electronic device apparatus comprising:
- a memory storing processor-executable instructions;
- a processor coupled to the non-volatile memory, wherein the processor executable instructions instruct the processor to perform the following steps:
- identifying a hardware configuration and an operating system for a programmable electronic device, wherein identifying the operating system includes selecting the operating system from one of a plurality of versions of operating system software, wherein the URL specifies a file corresponding to the image for the identified operating system;
- generating an image request in the form of a uniform resource locator (URL), wherein the URL is based at least in part on the identified hardware configuration and the identified operating system, wherein the URL includes a path to the image; and
- transmitting the image request to a server networked to the programmable electronic device.

* * * * *

UNITED STATES PATENT AND TRADEMARK OFFICE
CERTIFICATE OF CORRECTION

| | | |
|---|---|---|
| PATENT NO. | : 7,797,525 B2 | Page 1 of 1 |
| APPLICATION NO. | : 10/883416 | |
| DATED | : September 14, 2010 | |
| INVENTOR(S) | : Sam Jung-Won Lee et al. | |

It is certified that error appears in the above-identified patent and that said Letters Patent is hereby corrected as shown below:

In column 20, line 21, in Claim 14, delete "corresponding:" and insert -- corresponding --, therefor.

Signed and Sealed this
Thirty-first Day of May, 2011

David J. Kappos
*Director of the United States Patent and Trademark Office*